United States Patent
Giangrasso (10) Patent No.: US 10,645,919 B2
(45) Date of Patent: May 12, 2020

(54) BIRD DETERRENT

(71) Applicant: Daniel Giangrasso, Trumbull, CT (US)

(72) Inventor: Daniel Giangrasso, Trumbull, CT (US)

( * ) Notice: Subject to any disclaimer, the term of this patent is extended or adjusted under 35 U.S.C. 154(b) by 245 days.

(21) Appl. No.: 15/611,103

(22) Filed: Jun. 1, 2017

(65) Prior Publication Data

US 2017/0347641 A1 Dec. 7, 2017

Related U.S. Application Data (60) Provisional application No. 62/490,228, filed on Apr. 26, 2017, provisional application No. 62/443,877, filed on Jan. 9, 2017, provisional application No. 62/344,028, filed on Jun. 1, 2016.

(51) Int. Cl.
*A01M 29/08* (2011.01)
*A01M 29/16* (2011.01)

(52) U.S. Cl.
CPC ............ *A01M 29/16* (2013.01); *A01M 29/08* (2013.01)

(58) Field of Classification Search
CPC ...... A01M 29/00; A01M 29/06; A01M 29/08; G09F 3/00; G09F 3/14
See application file for complete search history.

(56) References Cited

U.S. PATENT DOCUMENTS

| | | | |
|---|---|---|---|
| 267,486 A * | 11/1882 | Brooks | G09F 3/14 40/665 |
| 1,066,045 A * | 7/1913 | Pass | A01M 29/06 116/173 |
| 1,287,968 A | 12/1918 | Greenleaf | |
| 2,107,071 A * | 2/1938 | Gaus | G09F 3/14 100/296 |
| 2,488,280 A * | 11/1949 | Flood | G09F 3/14 40/663 |
| 2,488,509 A * | 11/1949 | Lewin | A01M 29/06 116/22 A |
| 2,488,510 A | 11/1949 | Lewin | |
| 2,722,195 A * | 11/1955 | Rockafeller | A01M 29/06 116/22 A |
| 3,085,545 A | 4/1963 | Ore | |

(Continued)

FOREIGN PATENT DOCUMENTS

| | | |
|---|---|---|
| AT | 412407 | 2/2005 |
| CN | 203505406 | 4/2014 |

(Continued)

*Primary Examiner* — Kristen C Hayes
(74) *Attorney, Agent, or Firm* — Ware, Fressola, Maguire & Barber LLP (57) ABSTRACT

An apparatus for deterring birds and other animals from an area is provided, including a sheet of a material, such as a metallic material, having a first end comprising a hole through the sheet, a second end separated from the first end by a length of the sheet and a width. The apparatus further includes a cable comprising a first loop at one end inserted through the hole in the first end of the sheet configured to attach the cable to the sheet and a second loop at another end and separated from the first loop. The second loop forms an opening having a diameter greater than the width of the sheet. The sheet can be inserted and passed through the second loop, which defines a third loop to secure the cable to a structure from which the sheet is suspended, by tightening the third loop around the structure.

20 Claims, 10 Drawing Sheets

(56) References Cited

U.S. PATENT DOCUMENTS

| | | | | |
|---|---|---|---|---|
| 3,407,550 | A | 10/1968 | Shaw | |
| 4,131,079 | A | 12/1978 | Rousseau, Jr. et al. | |
| 4,144,832 | A | 3/1979 | Dahl | |
| 4,597,357 | A * | 7/1986 | Lemessurier | A01M 29/08 116/22 A |
| 4,878,643 | A | 11/1989 | Stinson | |
| 4,910,901 | A | 3/1990 | Boyar | |
| 4,962,619 | A | 10/1990 | Chatten | |
| 5,018,286 | A * | 5/1991 | Zahner | G09F 3/0352 24/16 PB |
| 5,181,338 | A | 1/1993 | Chatten | |
| 5,322,032 | A | 6/1994 | Kaleta | |
| 5,343,651 | A | 9/1994 | Chatten | |
| 5,452,536 | A | 9/1995 | Chatten | |
| 5,901,491 | A | 5/1999 | Caldwell | |
| 6,126,145 | A | 10/2000 | Mohr | |
| 6,671,992 | B1 | 1/2004 | Price | |
| 6,742,470 | B2 | 6/2004 | Keithly | |
| 6,807,765 | B2 | 10/2004 | Watermann | |
| 7,052,348 | B2 | 5/2006 | Price | |
| 7,173,534 | B1 | 2/2007 | Markham et al. | |
| 7,246,569 | B2 | 7/2007 | Grandy et al. | |
| 7,255,060 | B2 | 8/2007 | Grandy | |
| 7,337,750 | B2 | 3/2008 | Drake | |
| 7,451,561 | B2 * | 11/2008 | Weisbart | G09F 3/14 40/634 |
| 7,481,021 | B2 | 1/2009 | Riddell | |
| 7,966,963 | B1 | 6/2011 | Caldwell et al. | |
| 8,171,875 | B1 | 5/2012 | Caldwell et al. | |
| 8,251,008 | B1 | 8/2012 | Jones | |
| 8,402,685 | B1 | 3/2013 | Marshall | |
| 8,438,998 | B2 | 5/2013 | Spencer | |
| 8,479,678 | B1 | 7/2013 | Sandoval et al. | |
| 8,869,732 | B1 | 10/2014 | Chervick | |
| D768,780 | S * | 10/2016 | Taddeo | D20/27 |
| 2004/0231612 | A1 | 11/2004 | Thompson, III et al. | |
| 2004/0244275 | A1 | 12/2004 | Forsberg et al. | |
| 2005/0000135 | A1 * | 1/2005 | Trigger | G09F 3/14 40/664 |
| 2005/0034343 | A1 * | 2/2005 | Weisbart | G09F 3/14 40/654.01 |
| 2005/0082083 | A1 | 4/2005 | Nolan | |
| 2005/0166537 | A1 | 8/2005 | Geiger | |
| 2005/0274314 | A1 | 12/2005 | Norton et al. | |
| 2006/0135010 | A1 * | 6/2006 | Moeller | A01M 29/06 441/64 |
| 2007/0137883 | A1 | 6/2007 | Naidoo | |
| 2008/0308046 | A1 | 12/2008 | Sedivec | |
| 2010/0101481 | A1 | 4/2010 | Delia | |
| 2010/0201525 | A1 | 8/2010 | Bahat et al. | |
| 2010/0230531 | A1 | 9/2010 | Fayed et al. | |
| 2013/0249218 | A1 | 9/2013 | Vassilev et al. | |
| 2016/0113264 | A1 | 4/2016 | Bailey | |

FOREIGN PATENT DOCUMENTS

| | | |
|---|---|---|
| GB | 1178678 | 1/1970 |
| GB | 2320999 | 7/1998 |
| WO | 0108478 | 2/2001 |
| WO | 2006011990 | 2/2006 |

\* cited by examiner

BIRD DETERRENT

CROSS-REFERENCE TO RELATED APPLICATIONS

The present application claims the benefit of U.S. Provisional Patent Application No. 62/344,028 filed Jun. 1, 2016, U.S. Provisional Patent Application No. 62/443,877 filed Jan. 9, 2017, and U.S. Provisional Patent Application No. 62/490,228 filed Apr. 26, 2017, each of which are hereby incorporated by reference in their entirety.

FIELD OF THE INVENTION

The present invention relates to a device for deterring birds, such as geese, from entering a particular area. The device can be secured to a tree, or other structure, and is configured to generate a noise deterrent that will keep geese or other birds or animals away.

BACKGROUND OF THE INVENTION

When people have outdoor gatherings, such gatherings have a tendency to attract birds or other animals to the area, which can create an annoyance to the people at the gathering. This is particularly likely when there is food at the gathering, or other elements that birds may find appealing. Similarly, gardens may attract birds and other animals because they include food that the birds or other animals may eat, which can damage the garden.

Scarecrows and other devices have been utilized to scare birds or animals away from an area. However, these devices have drawbacks for consumers. Such devices are limited in how they can be positioned in a particular area, either because they are constructed in a manner that only allows the device to be inserted in the ground, or they can only be used in combination with a mounting structure having a particular shape and dimensions, meaning a particular device can only be used in a particular setting. Other such devices may also include components that are susceptible to damage by weather elements.

What is needed therefore is a bird deterring device that can be adapted for use with mounting structures having a wide range of shapes and sizes so that a consumer can utilize a single device in a number of different locations.

SUMMARY OF THE INVENTION

The present invention addresses the shortcomings of the art by providing a bird deterrent apparatus including a metal sheet attached to a cable having a loop at the end of the cable. The metal sheet can be inserted into the loop in order to create a further loop, which can be positioned around a tree branch or any other mounting structure. The apparatus can be tightened around the tree branch or mounting structure by pulling the metal sheet further through the loop, thereby tightening the loop. The metal sheet of the apparatus can thereby be suspended from the tree branch or mounting structure, and provide a visual and/or audible deterrent that deters birds and other animals from the area.

As a result, the apparatus of the present invention can be used in any number of settings. For example, such an apparatus can be hung from a tree branch having one diameter in a consumer's yard during a gathering at the consumer's home, and subsequently taken down and used at a different location that may have a pole or other mounting structure that has a substantially different diameter than the tree branch.

In accordance with a first aspect of the invention, an apparatus for deterring birds and other animals from an area is provided. The apparatus comprises a sheet of a material comprising a first end comprising a hole through the sheet, a second end separated from the first end by a length of the sheet, and a width. The apparatus further comprises a cable comprising a first loop at one end of the cable inserted through the hole in the first end of the sheet configured to attach the cable to the sheet, and a second loop at another end of the cable and separated from the first loop, wherein the second loop defines an opening having a diameter greater than the width of the sheet. The sheet is configured to be inserted and passed through the second loop in order to form a third loop configured to secure the cable to a structure from which the sheet is suspended, by tightening the third loop around the structure. In accordance with one embodiment of the apparatus, the sheet is a metallic sheet.

In accordance with an embodiment of the apparatus according to the first aspect of the invention, the metallic sheet is configured to generate an audible noise when suspended in response to movement of the structure or the metallic sheet.

In accordance with one or more of the above-described embodiments of the apparatus according to the first aspect of the invention, the metallic sheet is made from a reflective material.

In accordance with one or more of the above-described embodiments of the apparatus according to the first aspect of the invention, the metallic sheet is substantially rectangular in shape and comprises rounded corners. In accordance with one such embodiment, the metallic sheet has a width of approximately two inches and the opening defined by the second loop has a diameter of at least 2.25 inches. Further in accordance with one such embodiment, at least a portion of the second end of the metallic sheet is coated in a substance configured to reduce any sharp edges on the metallic sheet. Further in accordance with one such embodiment, the length of the metallic sheet is approximately 21.75 inches.

In accordance with another embodiment of the apparatus according to the first aspect of the invention, the metallic sheet is substantially circular in shape.

In accordance with one or more of the above-described embodiments of the apparatus according to the first aspect of the invention, the metallic sheet is made from stainless steel.

Further in accordance with one or more of the above-described embodiments of the apparatus according to the first aspect of the invention, the cable is made from stainless steel and is braided.

In accordance with one or more of the above-described embodiments of the apparatus according to the first aspect of the invention, the first loop and the second loop of the cable are each fastened with crimps.

Further in accordance with one or more of the above-described embodiments of the apparatus according to the first aspect of the invention, the metallic sheet further comprises one or more eye-like element configured to disguise the metallic sheet as an animal.

In accordance with one or more of the above-described embodiments of the apparatus according to the first aspect of the invention, the apparatus further comprises a feather. A base section of the feather comprises an opening configured to receive a first end of a wire, and the wire comprises a second end configured to be inserted through the hole in the metallic sheet to attach the wire and the feather to the metallic sheet. In one such embodiment, a tube is affixed to the base section of the feather and comprises an opening configured to overlap with the opening in the base section of the feather, and the wire is configured to be inserted through the opening in the tube overlapping the opening in the feather.

Further in accordance with one or more of the above-described embodiments of the apparatus according to the first aspect of the invention, the apparatus further comprises a mounting device. The mounting device comprises a ground spike configured to plant the mounting device into ground and a plurality of telescoping portions extending from the ground spike. In such an embodiment, the mounting device is the structure from which the metallic sheet is suspended. The mounting device in one particular embodiment may comprise three telescoping portions, including a first telescoping portion having a first diameter and configured to be secured to the ground spike; a second telescoping portion having a second diameter, which is less than the first diameter, and configured to be secured to the first telescoping portion, and a third telescoping portion having a third diameter, which is less than the second diameter, and configured to be secured to the second telescoping portion.

In accordance with one or more of the above-described embodiments of the apparatus according to the first aspect of the invention, the apparatus further comprises a mounting device comprising a first mounting section configured to secure the mounting device to a wall or other surface and a second mounting section separated from the first mounting section by an angle. In such an embodiment, the mounting device is the structure from which the metallic sheet is suspended, and the metallic sheet is suspended from the second mounting section. In one particular further embodiment of this embodiment of the invention, the second mounting section is greater in length than the first mounting section.

DETAILED DESCRIPTION OF THE INVENTION

The present invention will now be described with reference made to FIGS. 1A-6D.

An exemplary embodiment of an apparatus or device 10 for deterring birds and other animals from approaching an area according to the present invention is shown in FIGS. 1A-1D.

In the embodiment shown in FIGS. 1A-1D, the device 10 comprises a sheet 11 of metal, such as stainless steel, that is attached to a cable 12. At one end of the cable 12, a loop 14a is formed that passes through an opening or hole 13 in the sheet 11 to attach the cable 12 to the sheet 11. At the opposing end of the cable 12, a second, end loop 15a is formed, which defines an opening.

Figures 1A, 1B:
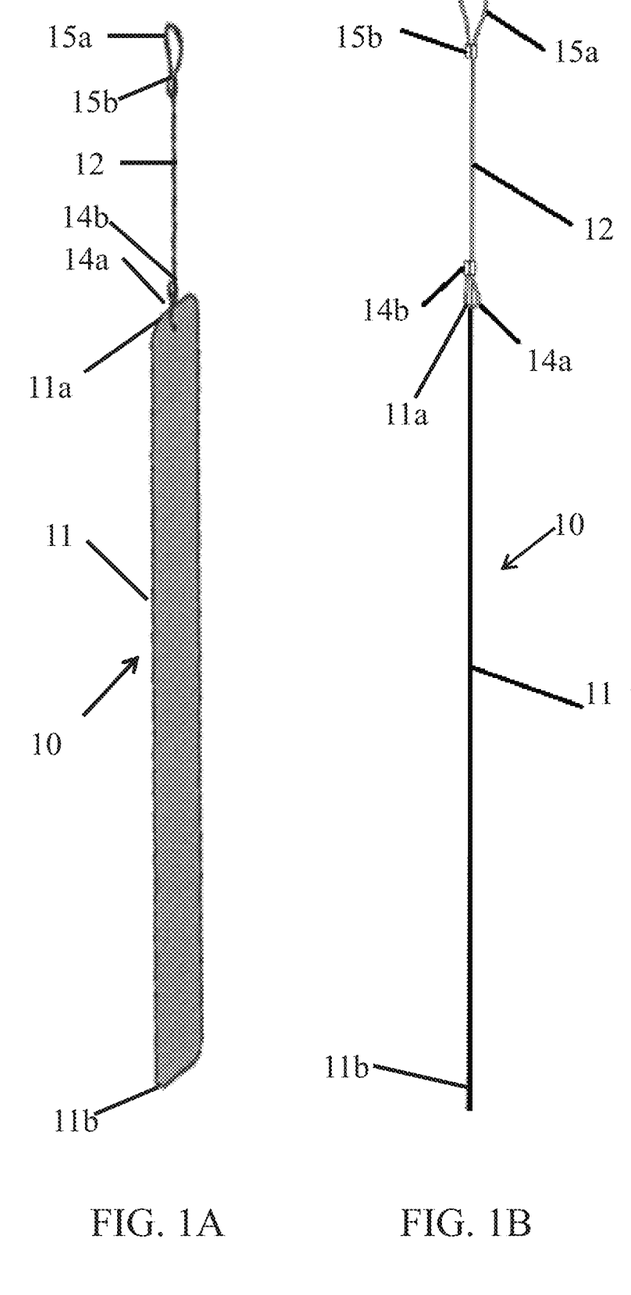
FIG. 1A shows a perspective view of a bird deterrent apparatus in accordance with an embodiment of the invention.
FIG. 1B shows a side view of a bird deterrent apparatus in accordance with a further embodiment of the invention.
Figure 1C:
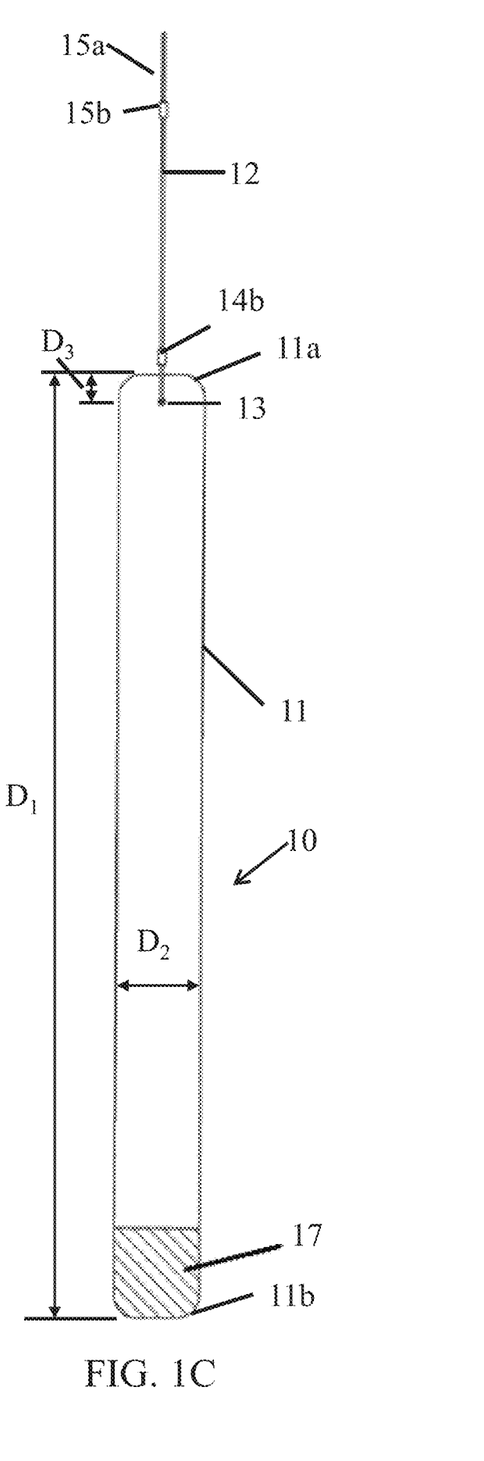
FIG. 1C shows a view of a bird deterrent apparatus in accordance with a further embodiment of the invention.
Figure 1D:
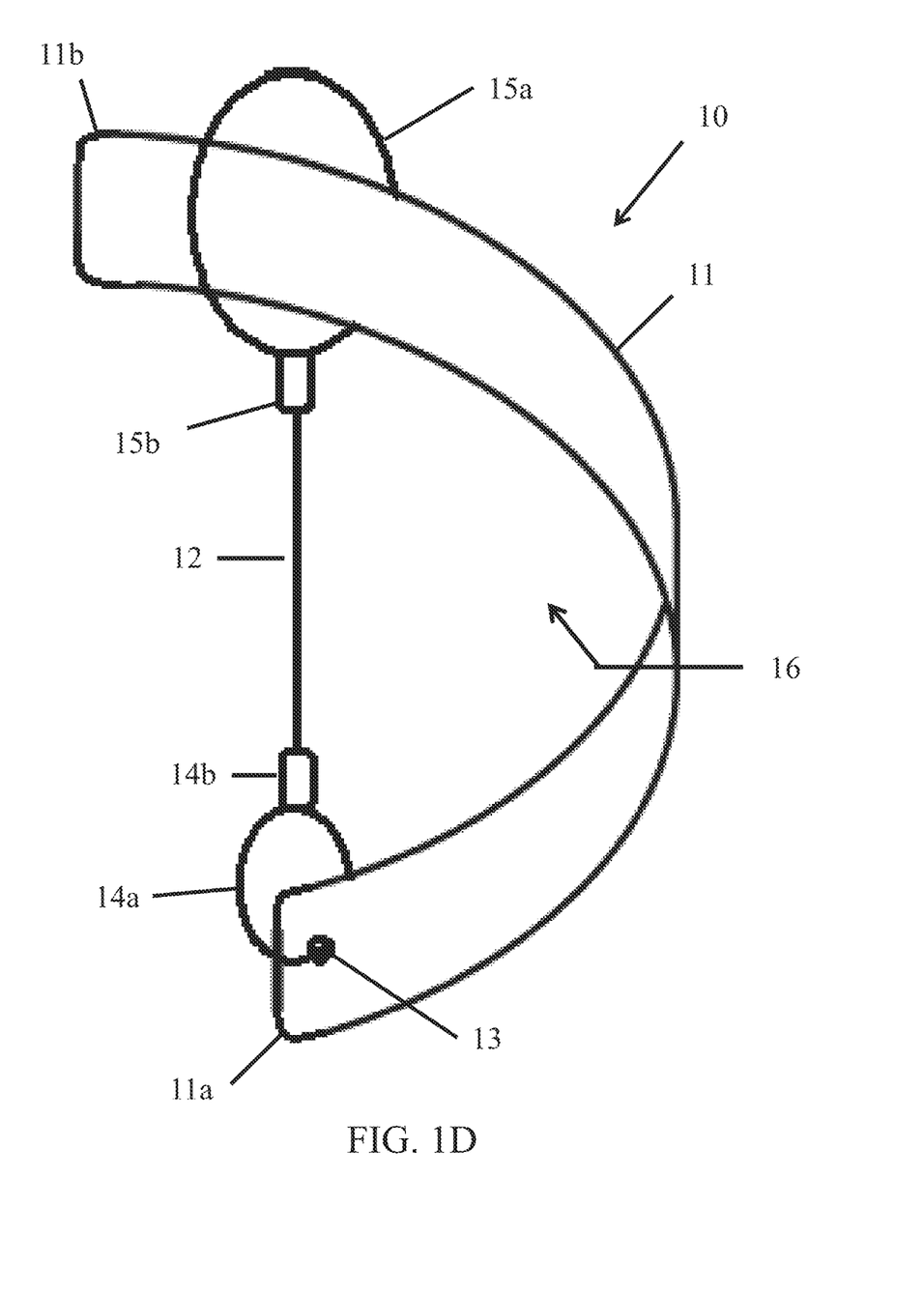
FIG. 1D shows a view of a bird deterrent apparatus in which a loop is formed for securing the apparatus to a structure, in accordance with an embodiment of the invention.

In accordance with an embodiment of the invention, the device 10 can be attached to a tree branch or other structure, by passing the sheet 11 through the end loop 15a (e.g., by inserting the end 11b of the sheet 11 that is not attached to the cable 12 and pulling the sheet 11 through the end loop 15a), thereby creating a further loop 16 that can be placed around the tree branch or other structure as shown for example in FIG. 1D. This further loop 16 can be tightened around the branch or other structure, securing the device to the branch or other structure. This allows the device 10 to be easily adaptable and used with a variety of different structures or tree branches having a wide range of sizes. The loop 16 can be placed over structures or branches having differing sizes and tightened to secure the loop 16 around the particular structure or branch. The sheet 11 is suspended from the tree branch or structure in this configuration, hanging by the cable 12. When the sheet 11 makes a flapping motion, it generates a noise that deters geese and other birds or animals. The flapping motion can be created by wind, an individual, or some other external stimulus on the tree branch or structure to which the device 10 is attached.

In a preferred embodiment, the material used to create the sheet 11 is a 0.004 gauge stainless steel. For example, the stainless steel material can be strip type 301 Hi Yield Temper, #1 Round edge, 0.00400+/−0.0002×2.02800+/−0.005. Other types of stainless steel or other materials, including other metallic and plastic materials, can be used in alternative embodiments of the present invention. In the exemplary embodiment shown in FIGS. 1A-1D, the sheet 11 is substantially rectangular and has a length ($D_1$) of approximately 21.75 inches and a width ($D_2$) of approximately two inches. The corners of the sheet 11 are rounded. At one end 11a of the sheet 11, a hole 13 is drilled through the sheet 11 for receiving the cable 12. The hole 13 may be approximately ⅛ of an inch in diameter, and positioned a distance ($D_3$) from the end 11a of the sheet 11 of approximately 0.75 inches. In certain embodiments, there may be a stainless steel, brass, galvanized metal or black Ox grommet at the end 11a of the deterrent sheet 11 where the cable 12 attaches, which may require a hole 13 having a diameter of approximately 0.25 inches to install the grommet. The grommet is pressed into place with a grommet setting device. In alternative embodiments of the invention, the dimensions of the sheet 11 may vary without departing from the scope of the invention.

The opposite end 11b of the sheet 11 that is not secured to the cable 12 can be provided with a protective coating 17. The protective coating 17 reduces sharp edges at the end 11b of the sheet 11 and the hazard from the sheet 11 being whipped in the air. Examples of the material used for the protective coating 17 include but are not limited to Plasti Dip® coating, molded plastic or rubber. In alternative embodiments of the invention, the edges at the base end 11b of the sheet 11 may be sufficiently rounded such that no protective coating 17 is required. The uncoated portion of the sheet 11 can be a reflective material or comprise reflective elements. The highly reflective nature of the sheet 11 will additionally cause birds and other animals to avoid or leave the area.

The cable 12 used in the device 10 of the present invention can be a sixteen gauge braided cable made from steel or stainless steel, or can be made from any other suitable for use as a cable or rope. The loops 14a, 15a formed by the cable 12 can be fastened by crimps 14b, 15b, which can be aluminum dual barrel crimps. The end of the cable 12 secured to the sheet 11 forms a loop 14a that may be between approximately 0.75 and 1.25 inches in diameter. The end of the cable 12 that is not secured to the sheet forms a loop 15a defining an opening and having a diameter of approximately 2.25 inches, or a diameter that is greater than the width or length of the sheet 11 and is sufficient to allow for the insertion of an end 11b of the sheet 11 through the loop 15a. The end 11b of the sheet 11 is passed through the end loop 15a to secure the device 10 to a structure, as previously described and shown in FIG. 1D.

It is noted that alternative embodiments of the present invention can be provided beyond that shown in FIGS. 1A-1D without departing from the scope of the invention.

Figure 2A:
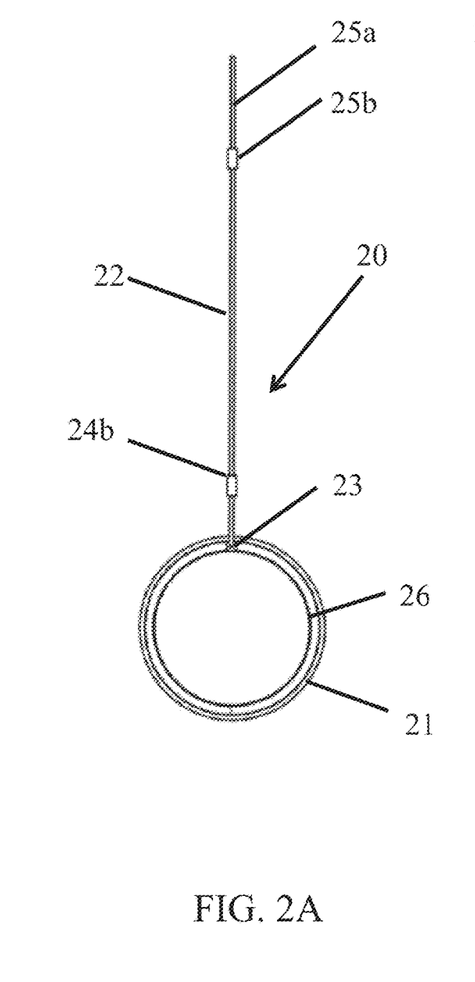
FIG. 2A shows a first view of a bird deterrent apparatus in accordance with a further embodiment of the invention.
Figure 2B:
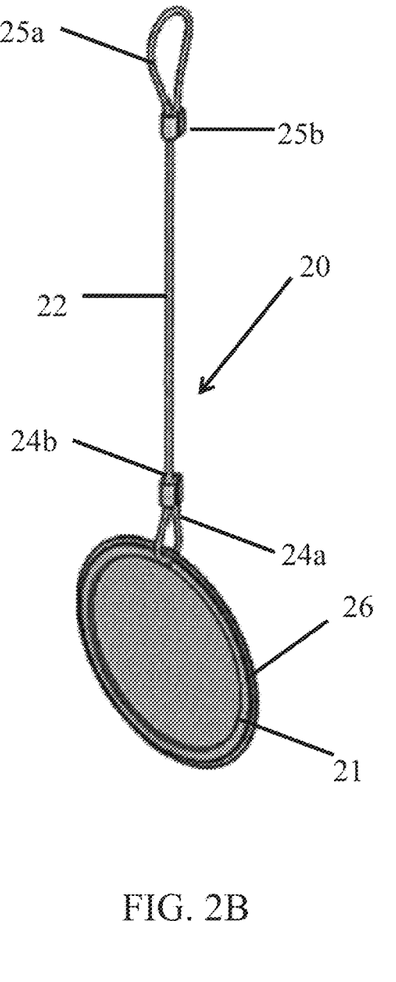
FIG. 2B shows a second view of a bird deterrent apparatus in accordance with a further embodiment of the invention.
Figure 2C:
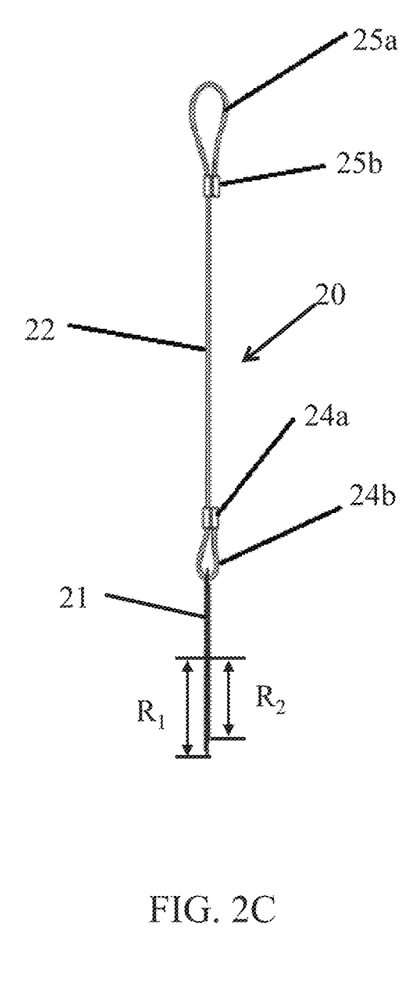
FIG. 2C shows a side view of a bird deterrent apparatus in accordance with a further embodiment of the invention.

For example, in one alternative embodiment, a device 20 can be provided with a circular sheet 21 or sheets, shown for example in FIGS. 2A-2C. The circular sheet 21 can be used with a cable 22, which has a first loop 24a inserted through an opening 23 in the circular sheet 21. The cable 22 includes a second loop 25a, through which the circular sheet 21 can be inserted for securing the device 20 to a structure, in the same manner as previously described in reference to FIGS. 1A-1D. The loops 24a, 25a formed by the cable 22 can be fastened by crimps 24b, 25b, which can be aluminum dual barrel crimps. The circular sheet 21 may be smaller in size than the rectangular sheet 11 shown in FIGS. 1A-1D and may also have a greater thickness. For example, the radius ($R_1$) of the circular sheet 21 may be approximately 1.515 inches, and the diameter of the second loop 25a may be approximately 3.5 inches, or greater than the diameter of the circular sheet 21 to allow for the insertion of the circular sheet 21 through the loop 25a. The circular sheet 21 may also include an outer ring 26, through which the opening 23 is made. The radius ($R_2$) of the circular sheet 21 up to the outer ring 26 may be approximately 1.368 inches.

In other embodiments of the present invention, the sheet of the apparatus may also be provided with design elements, logos or text. In one embodiment of the invention shown for example in FIG. 4, an apparatus 40 is provided with a sheet 41 having a pair of eye-like elements 42 attached to or drawn or etched onto one side or both sides of the sheet 41. This may add a further deterrent effect, as the eyes 42 may resemble those of another animal or creature to an approaching bird. The apparatus 40 may otherwise be configured in the same manner as the apparatus 10, as shown in FIGS. 1A-1D and described above.

In further embodiments of the invention, an additional deterrent may be provided in combination with any of the previously described devices 10, 20, 40, and variations thereof. An example of the additional deterrent device 30 is shown in FIGS. 3A-3H.

The deterrent device 30 includes a feather 31, such as a bird feather, which is affixed to a wire 32 or cable. A tube 33 is positioned over a base end 37 of the feather 31, and overlapping holes 35, 36 are provided through the tube 33 and the end 37 of the feather 31, through which the wire 32 is inserted, to attach the wire 32 to the tube 33 and feather 31 at one end 34 of the wire 32. The opposite end of the wire 32 can be looped through the hole 13 in the sheet 11, as shown in any of FIGS. 1A-1D and described previously for example, for attaching the feather-containing deterrent device 30 to the device 10 of FIGS. 1A-1D. One or more of the feather-containing deterrent devices 30 can be combined with the devices 10, 20, 40 of FIG. 1A-2C or 4 to provide a further deterrent to birds, as the feather 31 creates the appearance of a bird, serving to deter further birds from the area. The loop 15a at the end of the cable 12 of the device 10 that the sheet 11 passes through can vary in size from the dimensions described previously, to accommodate the feathers 31, if necessary.

Figure 3A:
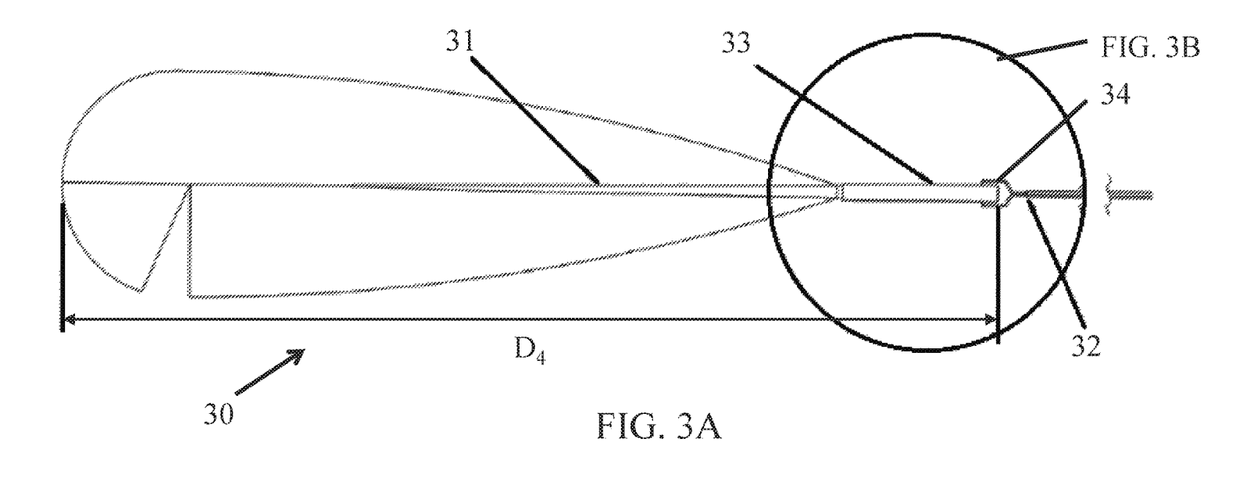
FIG. 3A shows a first view of an embodiment of a feather attachment for use in combination with a bird deterrent apparatus in accordance with an embodiment of the present invention, including a feather, a connecting tube and a wire.
Figure 3B:
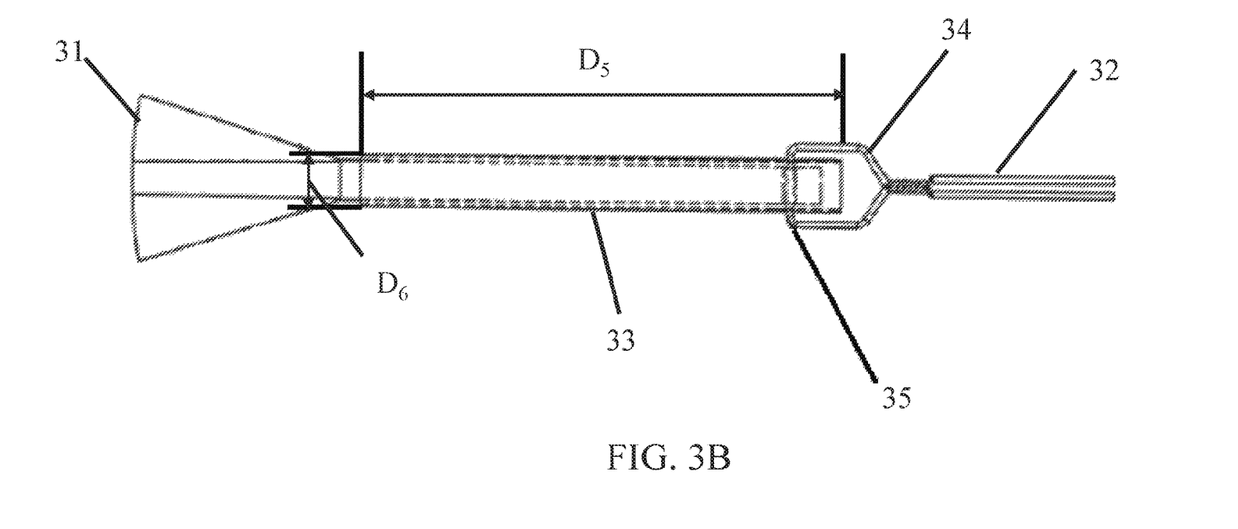
FIG. 3B shows a further view of the connection of the wire to the feather of the feather attachment, in accordance with an embodiment of the present invention.

FIGS. 3A-3B shows an example of the deterrent device 30, which includes a feather 31, wire 32 and tube 33. In the embodiment illustrated in the Figures, the feather 31 may have a length ($D_4$) of approximately 14.5 inches.

Figure 3C:
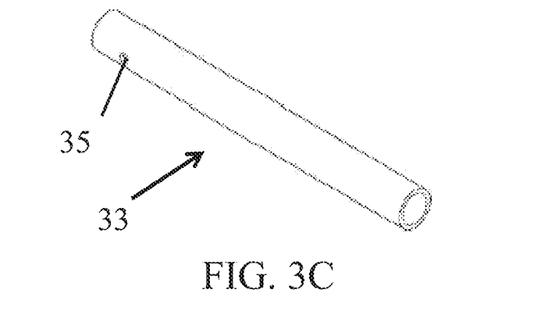
FIG. 3C shows a perspective view of the connecting tube of an embodiment of the feather attachment, in accordance with an embodiment of the present invention.
Figure 3D:
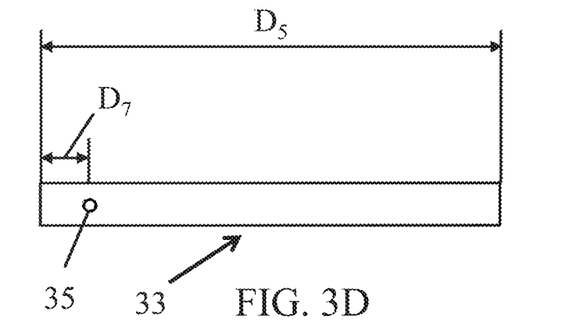
FIG. 3D shows a side view of the connecting tube of an embodiment of the feather attachment, in accordance with an embodiment of the present invention.
Figure 3E:
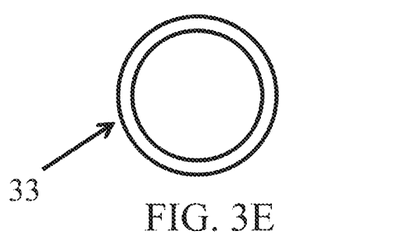
FIG. 3E shows an end view of the connecting tube of an embodiment of the feather attachment, in accordance with an embodiment of the present invention.

FIGS. 3C-3E shows an example of the tube 33, which is configured to be positioned over the end 37 of the feather 31 in the deterrent device 30. The tube 33 provides the deterrent device 30 with an additional layer of protection by preventing animals from chewing the wire 32 and/or feather end 37, causing breakage of the device. The feather 31 may be glued to the inside of the tube 33 with an adhesive, such as epoxy, or crazy glue or gorilla glue. The tube 33 is not limited to any particular set of dimensions, but is dimensioned for receiving the end 37 of a feather 31 so as to cover the end 37 of the feather 31. For example, the tube 33 may have a length ($D_5$) of approximately 2.4 inches and/or be substantially similar in length to the length of the base end 37 of the feather 31. The tube 33 may have an outer diameter ($D_6$) of approximately 0.25 inches, or another diameter that is sufficient to receive the end 37 of the feather 31. The tube 33 is not limited to any specific material of manufacture, but can be made from any number of suitable materials, including for example, stainless steel, chrome, plastic and galvanized metal. In the example shown in FIGS. 3A-3E, the tube 33 is a 304 stainless steel round tube having a wall thickness of approximately 0.028 inches. An opening 35 is formed through an end of the tube 33 for receiving an end 34 of the wire 32. The opening 35 may be a distance ($D_7$) of approximately 0.25 inches from the end of the tube 33 and have a diameter of approximately 0.063 inches. The tube 33 may be deburred after manufacturing so there are no wire edge burrs on the outer diameter of the tube 33, protecting the tube 33 from scratches during the manufacturing process.

Figure 3F:
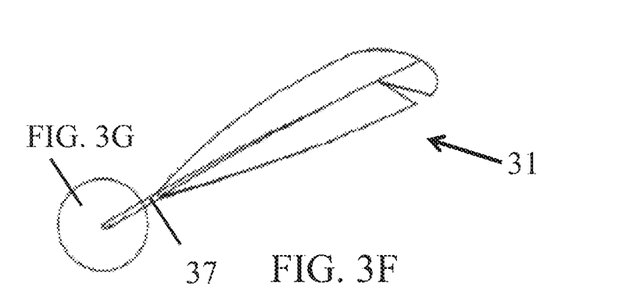
FIG. 3F shows a perspective view of the feather of an embodiment of the feather attachment, in accordance with an embodiment of the present invention.
Figure 3G:
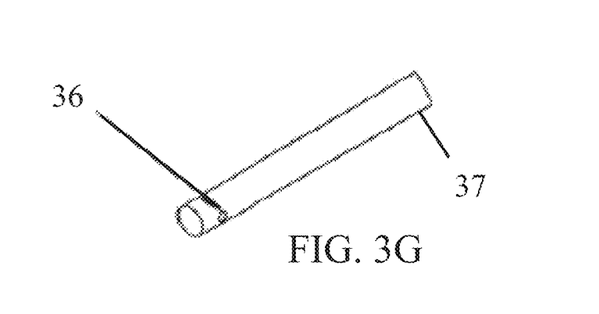
FIG. 3G shows a view of a base section of the feather of an embodiment of the feather attachment, in accordance with an embodiment of the present invention.

FIGS. 3F and 3G show an example of the feather 31 in an embodiment of the deterrent device 30. An opening 36 is formed through the end 37 of the feather 31 for receiving an end 34 of the wire 32. The opening 36 may have a diameter of approximately 0.063 inches and be positioned approximately 0.15 inches from the end of the feather 31.

Figure 3H:
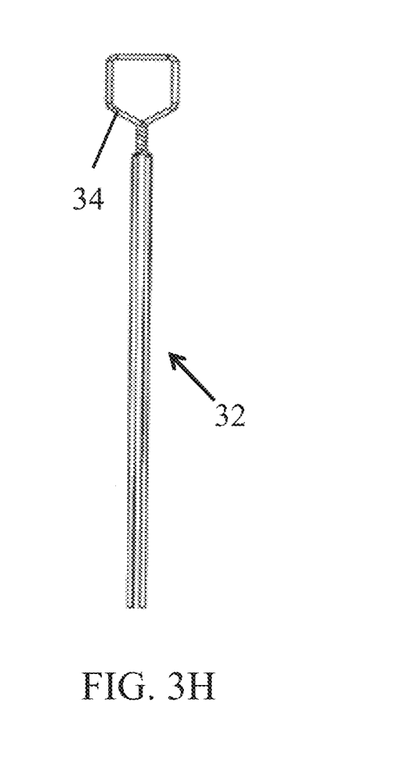
FIG. 3H shows a view of the wire of the feather attachment, in accordance with an embodiment of the present invention.
Figure 4:
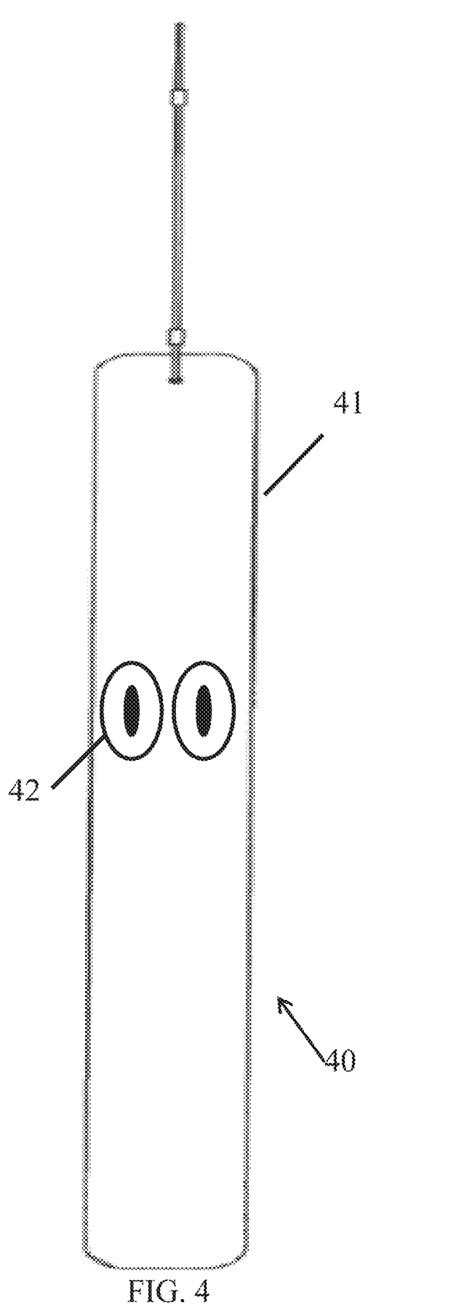
FIG. 4 shows a view of a bird deterrent apparatus in accordance with a further embodiment of the invention.

FIG. 3H shows an example of the wire 32 that is provided in the deterrent device 30, which passes through overlapping openings 35, 36 in the feather 31 and the tube 33. The wire 32 is not limited to any specific material of manufacture, but can be made from any number of suitable materials, including for example, stainless steel, chrome, plastic and galvanized metal. In the example shown in FIG. 3H, the wire 32 is a twenty gauge steel wire, but the gauge of the wire 32 may vary in other embodiments and may be, for example, sixteen gauge or twenty-eight gauge.

The dimensions shown in FIG. 3A-3H are for illustrative purposes only of one embodiment of the invention, and may vary in alternative embodiments depending on the needs of the particular embodiment. For example, in additional embodiments, the length and/or width of the feather 31 can vary, the thickness of the wall of the rounded tube 33 can vary depending on the need to prevent a breakdown of the tube 33; the tube 33 can be shorter or longer in length, and the inside and outside diameter of the tube 33 can be bigger or smaller in size, to accommodate feathers 31 of different sizes, for example.

The bird deterrent device 10, 20, 40 described herein may also be used in combination with one of several mounting devices, as an alternative to attaching the device to a tree branch. Examples of such mounting devices are illustrated in FIGS. 5A-5I and 6A-6D.

Figure 5A:
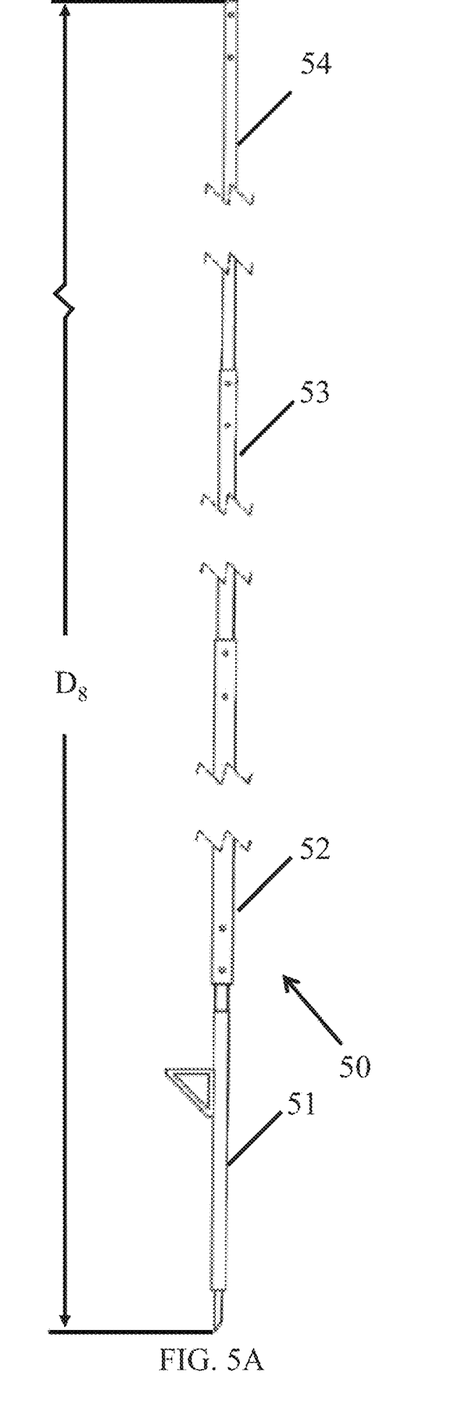
FIG. 5A shows a telescoping mounting device for use in combination with a bird deterrent apparatus in accordance with an embodiment of the present invention, including a ground spike, a first tube, a second tube and a third tube.
Figure 5B:
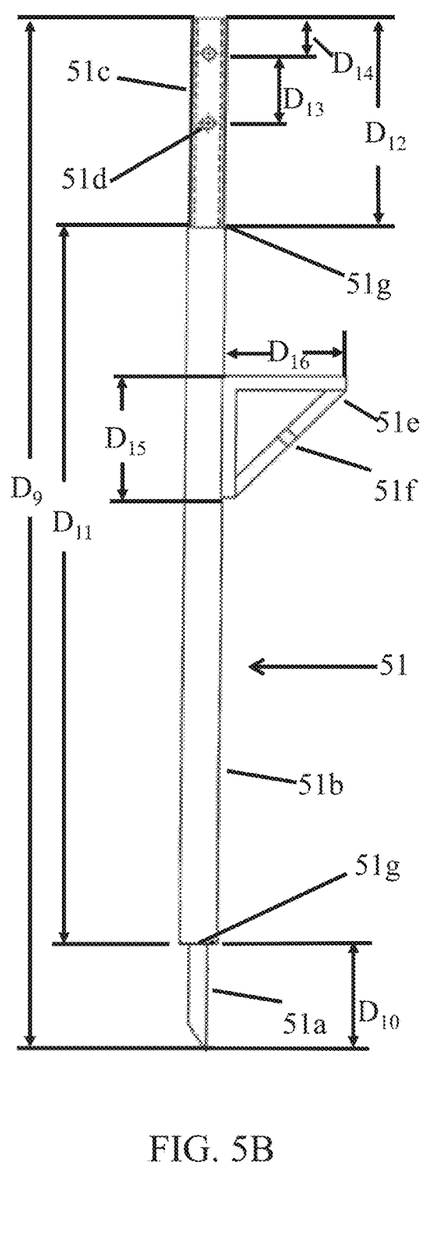
FIG. 5B shows a first side view of the ground spike of an embodiment of the telescoping mounting device, in accordance with an embodiment of the present invention.
Figure 5C:
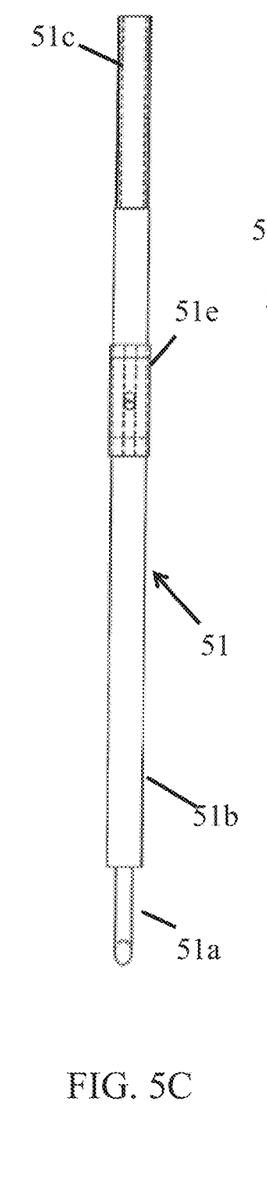
FIG. 5C shows a second side view of the ground spike of an embodiment of the telescoping mounting device, in accordance with an embodiment of the present invention.
Figure 5D:
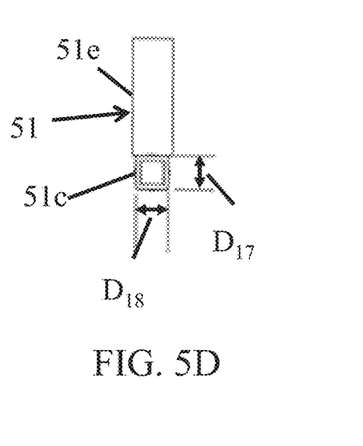
FIG. 5D shows a first end view of the ground spike of an embodiment of the telescoping mounting device, in accordance with an embodiment of the present invention.
Figure 5E:
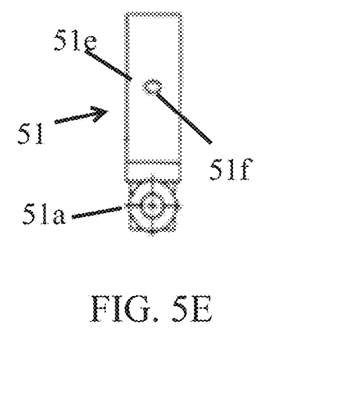
FIG. 5E shows second end view of the ground spike of an embodiment of the telescoping mounting device, in accordance with an embodiment of the present invention.

FIG. 5A shows a telescoping mounting device 50, which can be inserted into the ground to elevate the bird deterrent device 10, 20, 40 to a particular height. In the embodiment illustrated in FIGS. 5A-5H, the telescoping mounting device 50 includes a ground spike 51, a first, large tube 52, a second, medium tube 53 and a third, small tube 54. The bird deterrent device may be attached to the topmost tube 54 in the assembled telescoping mounting device 50 to mount the bird deterrent device at a particular height. In the embodiment illustrated in the FIG. 5A, the telescoping mounting device 50 may have a height ($D_8$) of 195.375 inches, although this height may vary depending on the lengths of the respective components of the telescoping mounting device 50 and may be adjustable to raise or lower the height. The telescoping mounting device 50 and its components can be made from any material suitable for the purpose of the mounting device 50, including stainless steel, aluminum or other metals, or a plastic material.

FIGS. 5B-5E shows the ground spike 51. The ground spike 51 may include a spike portion 51a configured to be inserted into the ground, a body section 51b and a connecting section 51c. In the embodiment illustrated in the FIG. 5B, the ground spike 51 may have a height ($D_9$) of approximately 29.5 inches, and in such an embodiment, the height ($D_{10}$) of the spike portion 51a may be approximately three inches, the height ($D_{11}$) of the body section 51b may be approximately 20.5 inches, and the height ($D_{12}$) of the connecting section 51c may be approximately six inches. The spike portion 51a may have a diameter of approximately 0.5 inches and the body section 51b may have a diameter of approximately 1.063 inches. The connecting section 51c may include one or more openings 51d through the connecting section 51c, configured to receive a bolt for attachment to a tube 52. In the embodiment shown in FIG. 5B, the connecting section 51c includes two openings 51d separated by a distance ($D_{13}$) of approximately 3.063 inches, and the topmost opening 51d is positioned at a distance ($D_{14}$) of approximately one inch from the end of the ground spike 51. The openings 51d may have a diameter of approximately 0.34 inches. The connecting section 51c may have a width ($D_{17}$, $D_{18}$) of one inch. The ground spike 51 may also include a support member 51e affixed to the body section 51b. The support member 51e may be triangular in shape and include an opening 51f for receiving a grounding lug. The support member 51e may have a height ($D_{15}$) and a length ($D_{16}$) of approximately 3.5 inches each, and the opening 51f may have a diameter of approximately 0.34 inches. The spike section 51a, body section 51b and connecting section 51c may be welded together at weld points 51g.

Figure 5F:
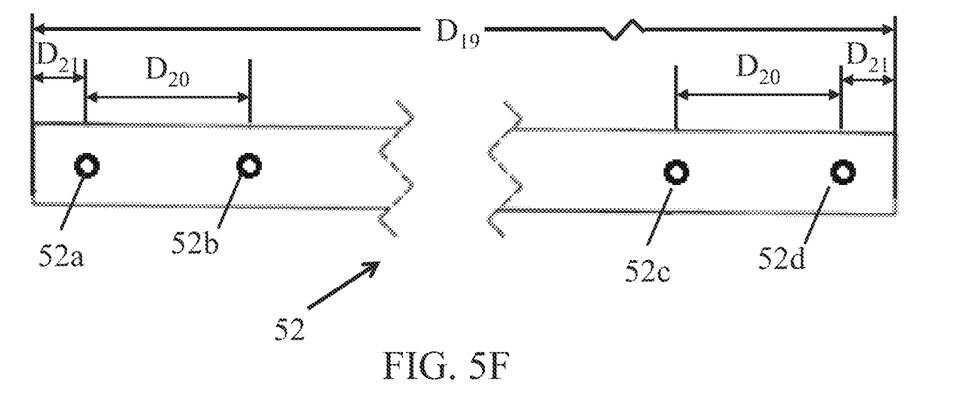
FIG. 5F shows a view of the first tube of an embodiment of the telescoping mounting device, in accordance with an embodiment of the present invention.
Figure 5G:
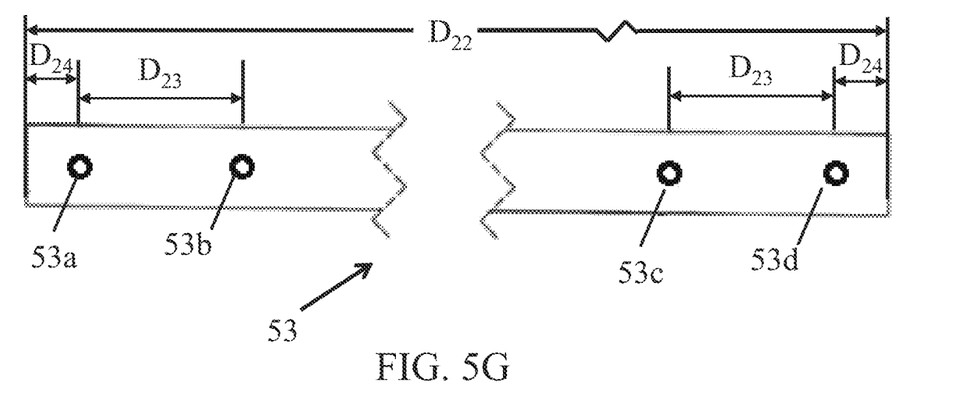
FIG. 5G shows a view of the second tube of an embodiment of the telescoping mounting device, in accordance with an embodiment of the present invention.
Figure 5H:
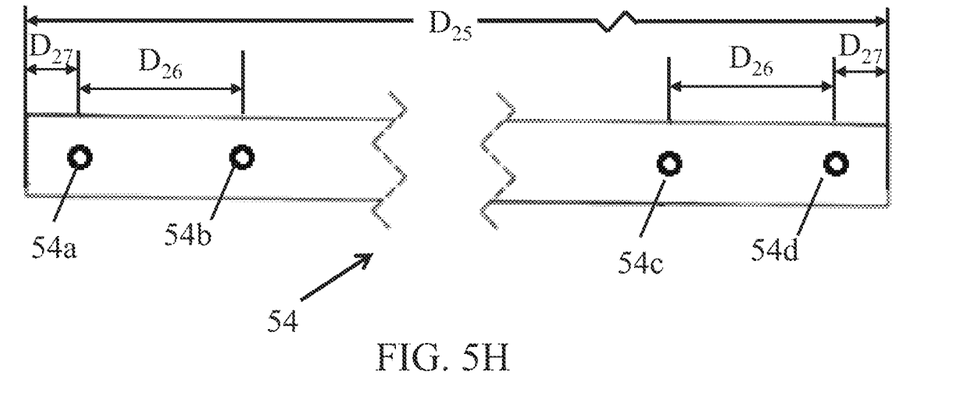
FIG. 5H shows a view of the third tube of an embodiment of the telescoping mounting device, in accordance with an embodiment of the present invention.
Figure 5I:
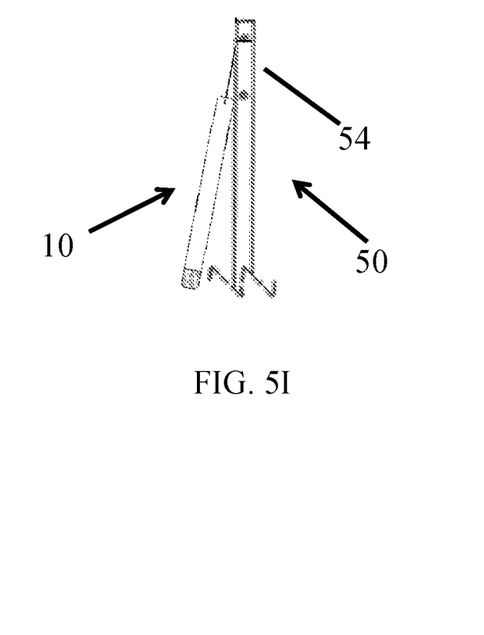
FIG. 5I shows a view of a bird deterrent apparatus and the telescoping mounting device, in accordance with an embodiment of the present invention.

FIG. 5F shows the first, large tube 52. FIG. 5G shows the second, medium tube 53. FIG. 5H shows the third, small tube 54. In the embodiment illustrated in the Figures, each tube 52, 53, 54 has a length ($D_{19}$, $D_{22}$, $D_{25}$) of approximately sixty inches, to provide the assembled mounting device 50 with a height of approximately fifteen feet. The terms "large", "medium" and "small" in reference to the size of tubes 52, 53, 54 refers to the diameter of each tube relative to the other tubes. For example, the diameter of the first tube 52 may be approximately 1.25 inches, the diameter of the second tube 53 may be approximately one inch, and the diameter of the third tube 54 may be approximately 0.75 inches. In alternative embodiments, the number and dimensions of the telescoping tubes may vary in order to provide mounting devices 50 having different heights.

Each of the components of the mounting device 50 (the ground spike 51, the first tube 52, the second tube 53 and the third tube 54) may comprise one or more openings 51d, 52a, 52b, 52c, 52d, 53a, 53b, 53c, 53d, 54a, 54b, 54c, 54d through the spike 51 or tube 52, 53, 54 configured to receive a bolt. When the mounting device 50 is assembled, the openings of one component may overlap with the openings of the component above or below it, in order to receive a bolt through both components, which can be secured in place by the addition of a nut in order to attach two components. The openings 52a, 52b, 52c, 52d, 53a, 53b, 53c, 53d, 54a, 54b, 54c, 54d through the tubes 52, 53, 54 may have a diameter of approximately 0.34 inches. The adjacent openings at each end of the respective tubes 52, 53, 54 may be separated by a distance ($D_{20}$, $D_{23}$, $D_{26}$) of approximately 3.063 inches, and the openings 52a, 52d, 53a, 53d, 54a, 54d may be positioned at a distance ($D_{21}$, $D_{24}$, $D_{27}$) of approximately one inch from the ends of the respective tube 52, 53, 54. The connections between the first tube 52, second tube 53 and third tube 54 can be sealed with a pipe grommet. Alternative manners of attaching the ground spike 51, the first tube 52, the second tube 53 and the third tube 54 can be provided, including for example retractable bolts positioned at the top or bottom of each component configured to be received in corresponding openings on an adjacent component, threaded sections positioned on the interior and/or exterior of the end portion of each component, clamps used to connect two components, or any other device known in the art that would be suitable for this purpose.

Figure 6A:
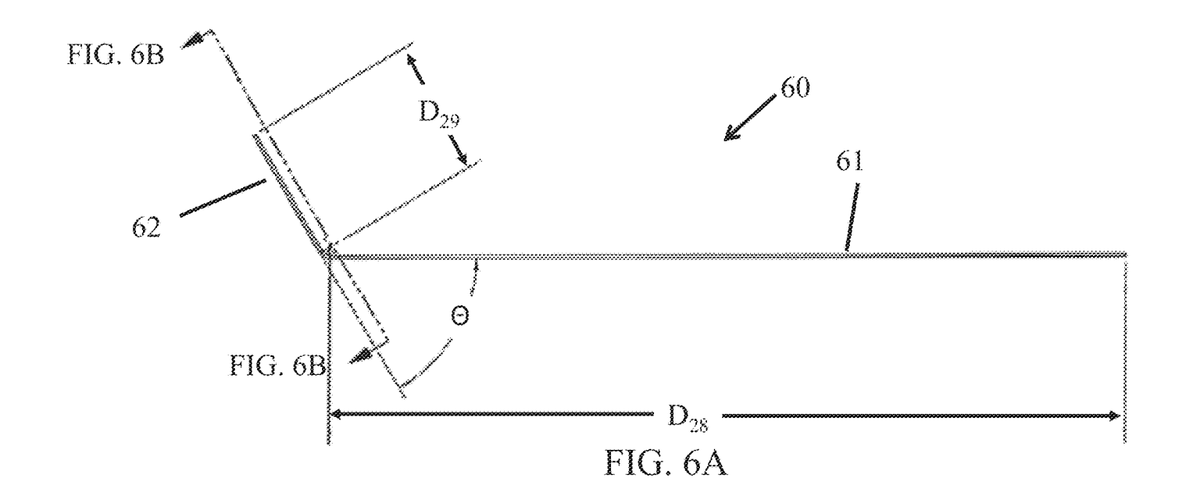
FIG. 6A shows a first, side view of a second mounting device for use in combination with a bird deterrent apparatus in accordance with an embodiment of the present invention.
Figures 6B, 6C:
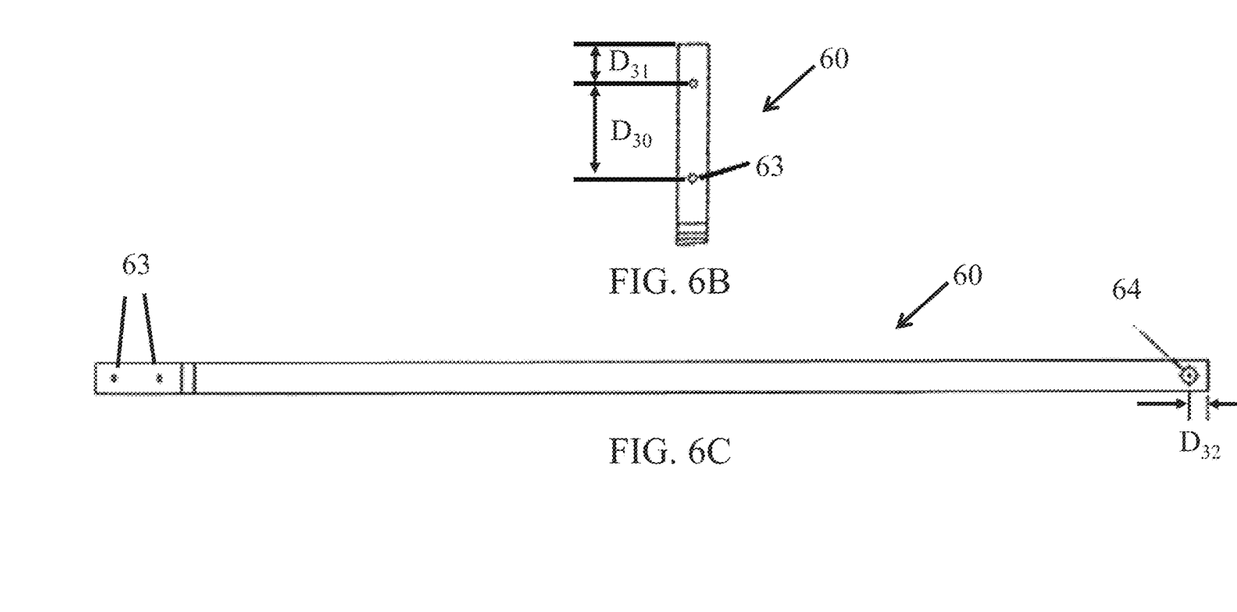
FIG. 6B shows an end view of the second mounting device, in accordance with an embodiment of the present invention.
FIG. 6C shows a second, side view of the second mounting device, in accordance with an embodiment of the present invention.
Figure 6D:
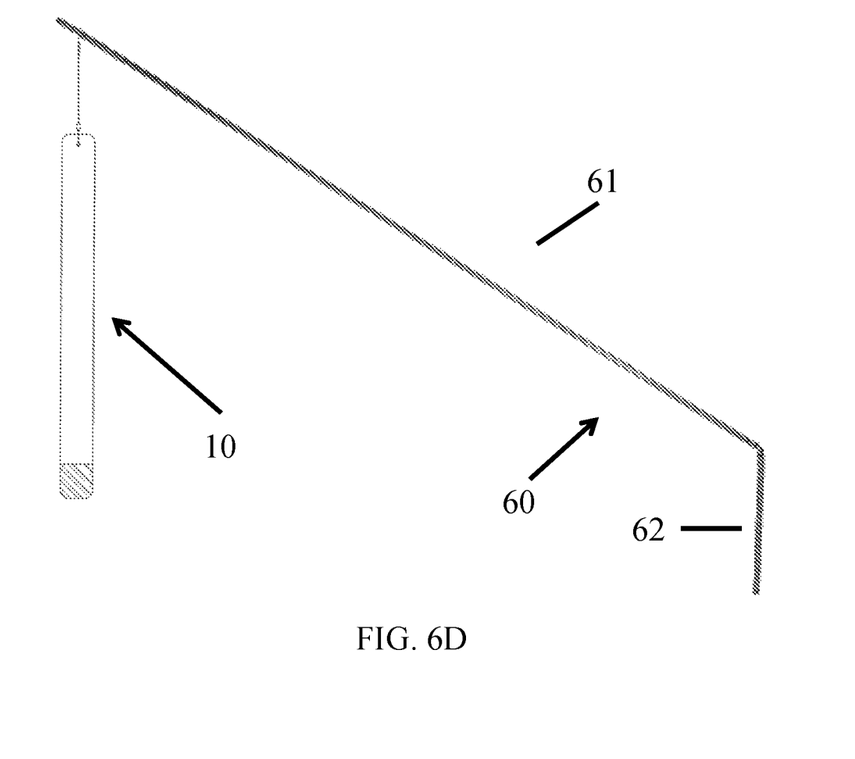
FIG. 6D shows a view of a bird deterrent apparatus and the second mounting device, in accordance with an embodiment of the present invention.

An alternative mounting device 60 for mounting a bird deterrent apparatus 10, 20 or 40 is illustrated in FIGS. 6A-6C. The mounting device 60 may be utilized to mount the bird deterrent device to a structure, such as a home or building. The mounting device 60 includes a first section 61, which can be used for attaching the bird deterrent device to the mounting device 60. The mounting device 60 also includes a second section 62, which can be used for mounting the mounting device 60 to the structure. One or more openings 63 can be provided through the second section 62, which can receive bolts, for example, used to attach the mounting device 60 to the structure. The thickness of the mounting device 60 may be approximately 0.13 inches. In the embodiment illustrated in FIGS. 6A-6C, the first section 61 has length ($D_{28}$) greater than the length ($D_{29}$) of the second section 62; however the present invention is not limited to such embodiments. In alternative embodiments, the dimensions of the mounting device 60 may vary, and the second section 62 may have a length greater than or substantially equal to the length of the first section 61. In the illustrated embodiment, the mounting device 60 may be made from a single blank of material having a length of approximately forty inches, in which the length ($D_{28}$) of the first section 61 is approximately 33.71 inches and the length ($D_{29}$) of the second section 62 is approximately 5.83 inches. The blank of the material forming the mounting device 60 can be bent at an angle ($\Theta$), so that the first section 61 can extend away from the second section 62 and the structure to which the second section 62 is mounted. In the embodiment shown in the Figures, this angle ($\Theta$) is approximately sixty degrees. The mounting device 60 may be made from any number of materials, including for example aluminum, stainless steel, or other metallic materials or a plastic material.

The second section 62 of the mounting device 60 can comprise one or more openings 63 to receive one or more bolts for mounting the mounting device 60 to a structure. In the embodiment illustrated in FIG. 6B, two openings 63 are provided, which have a diameter of approximately 0.25 inches are separated by a distance ($D_{30}$) of approximately 3.094 inches. The openings 63 may be positioned at a distance ($D_{31}$) of 1.281 inches from the end of the mounting device 60. The first section 61 of the mounting device 60 may also comprise one or more openings 64 that can be used in securing the bird deterrent apparatus to the mounting device 60. The opening 64 in the first section 61 may have a diameter of approximately 0.5 inches and may be positioned at a distance ($D_{32}$) of 0.63 inches from the end of the mounting device 60.

It is noted that the example dimensions identified above and shown in FIGS. 1A-6C may vary in alternative embodiments of the invention without departing from the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. An apparatus for deterring birds and other animals from an area, comprising:
   a sheet of a material, the sheet comprising:
      a first end comprising a hole through the sheet;
      a second end separated from the first end by a length of the sheet; and
      a width; and
   a cable comprising:
      a first loop at one end of the cable inserted through the hole in the first end of the sheet configured to attach the cable to the sheet; and
      a second loop at another end of the cable and separated from the first loop, wherein the second loop forms an opening having a diameter greater than the width of the sheet;
   wherein the sheet is configured to be inserted and passed through the second loop in order to define a third loop configured to secure the cable to a structure from which the sheet is suspended, by tightening the third loop around the structure;
   wherein the sheet is a metallic sheet; and
   wherein the cable is made from stainless steel and is braided.

2. The apparatus according to claim 1, wherein the metallic sheet is made from a reflective material.

3. The apparatus according to claim 1, wherein the metallic sheet is substantially rectangular in shape and comprises rounded corners.

4. The apparatus according to claim 3, wherein the metallic sheet has a width of approximately two inches, and wherein the opening defined by the second loop has a diameter of at least 2.25 inches.

5. The apparatus according to claim 3, wherein the length of the metallic sheet is approximately 21.75 inches.

6. The apparatus according to claim 1, wherein the metallic sheet is made from stainless steel.

7. The apparatus according to claim 1, wherein the first loop and the second loop of the cable are each fastened with crimps.

8. The apparatus according to claim 1, wherein the metallic sheet is substantially circular in shape.

9. The apparatus according to claim 1, further comprising a mounting device comprising:
   a ground spike configured to plant the mounting device into ground; and
   a plurality of telescoping portions extending from the ground spike;
   wherein the mounting device is the structure from which the metallic sheet is suspended.

10. The apparatus according to claim 9, wherein the plurality of telescoping portions comprises three telescoping portions, including,
    a first telescoping portion having a first diameter and configured to be secured to the ground spike;
    a second telescoping portion having a second diameter, which is less than the first diameter, and configured to be secured to the first telescoping portion, and
    a third telescoping portion having a third diameter, which is less than the second diameter, and configured to be secured to the second telescoping portion.

11. The apparatus according to claim 1, further comprising a mounting device comprising:
    a first mounting section configured to secure the mounting device to a wall or other surface; and
    a second mounting section separated from the first mounting section by an angle;
    wherein the mounting device is the structure from which the metallic sheet is suspended, and the metallic sheet is suspended from the second mounting section.

12. The apparatus according to claim 11, wherein the second mounting section is greater in length than the first mounting section.

13. An apparatus for deterring birds and other animals from an area, comprising:
    a sheet of a material, the sheet comprising:
      a first end comprising a hole through the sheet;
      a second end separated from the first end by a length of the sheet; and
      a width;
    a cable comprising:
      a first loop at one end of the cable inserted through the hole in the first end of the sheet configured to attach the cable to the sheet; and
      a second loop at another end of the cable and separated from the first loop, wherein the second loop forms an opening having a diameter greater than the width of the sheet; and
    a feather
    wherein the sheet is configured to be inserted and passed through the second loop in order to define a third loop configured to secure the cable to a structure from which the sheet is suspended, by tightening the third loop around the structure;
    wherein the sheet is a metallic sheet; and
    wherein the metallic sheet further comprises one or more eye-like element configured to disguise the metallic sheet as an animal.

14. The apparatus according to claim 13, further comprising a mounting device comprising:
    a ground spike configured to plant the mounting device into ground; and
    a plurality of telescoping portions extending from the ground spike;
    wherein the mounting device is the structure from which the metallic sheet is suspended.

15. The apparatus according to claim 13, further comprising a mounting device comprising:
    a first mounting section configured to secure the mounting device to a wall or other surface; and
    a second mounting section separated from the first mounting section by an angle;
    wherein the mounting device is the structure from which the metallic sheet is suspended, and the metallic sheet is suspended from the second mounting section.

16. The apparatus according to claim 13, wherein the first loop and the second loop of the cable are each fastened with crimps.

17. An apparatus for deterring birds and other animals from an area, comprising:
    a sheet of a material, the sheet comprising:
      a first end comprising a hole through the sheet;
      a second end separated from the first end by a length of the sheet; and
      a width;
    a cable comprising:
      a first loop at one end of the cable inserted through the hole in the first end of the sheet configured to attach the cable to the sheet; and
      a second loop at another end of the cable and separated from the first loop, wherein the second loop forms an opening having a diameter greater than the width of the sheet; and
    a feather
    wherein the sheet is configured to be inserted and passed through the second loop in order to define a third loop configured to secure the cable to a structure from which the sheet is suspended, by tightening the third loop around the structure;
    wherein the sheet is a metallic sheet; and
    wherein a base section of the feather comprises an opening configured to receive a first end of a wire, and the wire comprises a second end configured to be inserted through the hole in the metallic sheet to attach the wire and the feather to the metallic sheet.

18. The apparatus according to claim 17, wherein a tube is affixed to the base section of the feather and comprises an opening configured to overlap with the opening in the base section of the feather, and wherein the wire is configured to be inserted through the opening in the tube overlapping the opening in the feather.

19. The apparatus according to claim 17, further comprising a mounting device comprising:
    a ground spike configured to plant the mounting device into ground; and
    a plurality of telescoping portions extending from the ground spike;
    wherein the mounting device is the structure from which the metallic sheet is suspended.

20. The apparatus according to claim 17, wherein the first loop and the second loop of the cable are each fastened with crimps.

* * * * *